United States Patent
Gupta et al.

(10) Patent No.: US 11,941,603 B2
(45) Date of Patent: Mar. 26, 2024

(54) MULTIPURPOSE SMARTPHONE DEVICE

(71) Applicant: The Western Union Company, Denver, CO (US)

(72) Inventors: Abhinav Gupta, Foster City, CA (US); Khalid Fellahi, San Rafael, CA (US)

(73) Assignee: The Western Union Company, Denver, CO (US)

(*) Notice: Subject to any disclaimer, the term of this patent is extended or adjusted under 35 U.S.C. 154(b) by 49 days.

(21) Appl. No.: 16/825,258

(22) Filed: Mar. 20, 2020

(65) Prior Publication Data

US 2021/0295302 A1 Sep. 23, 2021

(51) Int. Cl.
| | |
|---|---|
| *G06Q 20/32* | (2012.01) |
| *G06F 21/32* | (2013.01) |
| *G06K 7/14* | (2006.01) |
| *G06Q 20/20* | (2012.01) |
| *G06Q 20/40* | (2012.01) |
| *G06Q 50/26* | (2012.01) |

(52) U.S. Cl.
CPC ......... *G06Q 20/3223* (2013.01); *G06F 21/32* (2013.01); *G06K 7/1417* (2013.01); *G06Q 20/204* (2013.01); *G06Q 20/3274* (2013.01); *G06Q 20/40145* (2013.01); *G06Q 50/265* (2013.01)

(58) Field of Classification Search
CPC ............. G06Q 20/3223; G06Q 20/204; G06Q 20/3274; G06Q 20/40145; G06Q 50/265; G06K 7/1417
USPC .......................................................... 705/17
See application file for complete search history.

(56) References Cited

U.S. PATENT DOCUMENTS

| | | |
|---|---|---|
| 6,725,383 B2 | 4/2004 | Kyle |
| 7,254,548 B1 | 8/2007 | Tannenbaum |
| 7,356,515 B2 | 4/2008 | Oppat et al. |
| 7,416,118 B2 | 8/2008 | Throckmorton et al. |
| 7,765,408 B1 | 7/2010 | Geosimonian |
| 7,865,439 B2 | 1/2011 | Seifert et al. |
| 8,083,137 B2 | 12/2011 | Tannenbaum |
| 8,397,988 B1 | 3/2013 | Zuili |
| 8,407,121 B2 | 3/2013 | Paintin |
| 8,504,473 B2 | 8/2013 | Paintin et al. |
| 8,880,425 B2 | 11/2014 | Loevenguth et al. |
| 9,858,401 B2 | 1/2018 | Fiske |
| 10,096,006 B2 | 10/2018 | Loevenguth et al. |
| 2001/0000535 A1 | 4/2001 | Lapsley et al. |
| 2001/0025342 A1 | 9/2001 | Uchida |
| 2002/0156728 A1 | 10/2002 | Jaschhof et al. |
| 2003/0046224 A1 | 3/2003 | Mujtaba et al. |

(Continued)

OTHER PUBLICATIONS

Nguyen, Viet H. Communication and Sensing Techniques for Smart, Seamless Human-Environment Interactions. Rutgers the State University of New Jersey, School of Graduate Studies. ProQuest Dissertations Publishing, 2019. (Year: 2019).*

(Continued)

*Primary Examiner* — Florian M Zeender
*Assistant Examiner* — Fawaad Haider
(74) *Attorney, Agent, or Firm* — Kilpatrick Townsend & Stockton LLP

(57) ABSTRACT

Embodiments described herein relate generally to a multi-purpose smartphone device. More specifically, embodiments described herein disclose a smartphone that is capable of being used as a point-of-sale (POS) device.

20 Claims, 10 Drawing Sheets

(56) References Cited

U.S. PATENT DOCUMENTS

| | | |
|---|---|---|
| 2003/0074310 A1 | 4/2003 | Grovit et al. |
| 2003/0220841 A1 | 11/2003 | Maritzen |
| 2006/0206419 A1 | 9/2006 | Rosti et al. |
| 2007/0208662 A1* | 9/2007 | Jeronimus ........ G06Q 20/40145 705/44 |
| 2008/0065533 A1 | 3/2008 | Whiting et al. |
| 2008/0167017 A1* | 7/2008 | Wentker ............. G06Q 30/0224 455/406 |
| 2008/0282334 A1 | 11/2008 | Yves et al. |
| 2009/0070257 A1 | 3/2009 | Csoka |
| 2009/0094163 A1 | 4/2009 | Shastry |
| 2009/0192934 A1 | 7/2009 | Chu et al. |
| 2009/0282466 A1 | 11/2009 | Uchida |
| 2010/0169212 A1 | 7/2010 | Paintin |
| 2010/0332335 A1 | 12/2010 | Hansen et al. |
| 2011/0246328 A1 | 10/2011 | Dunwoody et al. |
| 2011/0251892 A1 | 10/2011 | Laracey |
| 2011/0251906 A1 | 10/2011 | Loevenguth et al. |
| 2012/0030098 A1 | 2/2012 | Bulawa et al. |
| 2012/0041877 A1 | 2/2012 | Rao |
| 2012/0084203 A1 | 4/2012 | Mehew et al. |
| 2012/0089515 A1 | 4/2012 | Rodin |
| 2012/0150671 A1 | 6/2012 | Mercia et al. |
| 2012/0254992 A1* | 10/2012 | Levien ................ G06F 21/6218 726/21 |
| 2013/0117174 A1 | 5/2013 | Cole et al. |
| 2014/0358763 A1 | 12/2014 | Grovit et al. |
| 2015/0161588 A1 | 6/2015 | Loevenguth et al. |
| 2018/0189752 A1 | 7/2018 | Benjebli |
| 2019/0114060 A1* | 4/2019 | Resudek ................. G06F 18/22 |
| 2019/0180251 A1 | 6/2019 | Loevenguth et al. |
| 2020/0111103 A1* | 4/2020 | Kalaboukis ........ G06Q 20/4014 |
| 2021/0150535 A1* | 5/2021 | Chowdhury ............ G06F 21/32 |

OTHER PUBLICATIONS

Whisker, James; Lokanan, Mark Eshwar. Anti-money laundering and counter-terrorist financing threats posed by mobile money. Journal of Money Laundering Control; London vol. 22, Iss. 1, (2019): 158-172. (Year: 2019).*

PM Modi's game-changer digital push: Know how Aadhaar Pay works [Banking]. The Economic Times; New Delhi [New Delhi]. Apr. 15, 2017. (Year: 2017).*

Merritt , "Mobile Money Transfer Services: The Next Phase in the Evolution in Person-to-Person Payments", Retail Payments Risk Forum White Paper, Federal Reserve Bank of Atlanta, Aug. 2010, 32 pages.

Williamson , "Enhanced Authentication in Online Banking", G. E. Money, Diss. Utica College,, 2006, 42 pages.

Wilhelm Armah Kwaku Hesse, "Interback Money Transfer System for PC and Mobile," 2010 Applied Project, Ashesi University College, 59 pages.

* cited by examiner

MULTIPURPOSE SMARTPHONE DEVICE

BACKGROUND

Smartphones such as the Apple iPhone, Google Pixel, Samsung Galaxy, and the like have become integral to everyday life. Smartphones allow people to have instant access to the Internet and a vast amount of information. As smartphones have evolved so have their processing capabilities. However, even with the increased technological development of smartphones, there still exists a need for a multipurpose smartphone device capable of performing additional functions over those currently enabled by smartphones.

SUMMARY

Various embodiments involving a multiple purpose smartphone device are described herein. In one embodiment, a method may include receiving, by a smartphone, a link associated with a previous user action of a first user. The method may further include receiving, via a graphical user interface associated with the smartphone, a first user interaction with the link. The method may further include in response to receiving the first user interaction with the link, receiving, by a first input mechanism associated with the smartphone, first identification information associated with a second user, wherein the second user is different from the first user. Further in response to receiving the first user interaction with the link, receiving, by a second input mechanism associated with the smartphone, second identification information associated with the second user. The method may further include authenticating, based on the first identification information and the second identification information, the second user. The method may further include, in response to authenticating the second user, authorizing, the second user to conduct a transaction associated with the first user. Further in response to authenticating the second user, displaying, via the smartphone, a first set of instructions specific to the first user, wherein the first set of instructions contain information for conducting the transaction associated with the first user.

In one embodiment, the method may further include scanning, by the smartphone, a first identification instrument associated with the first user. In one embodiment, the first identification information is a government issued identification.

In one embodiment, the method may further include, in response to authenticating the second user, displaying, via the smartphone, a computer readable code, wherein the computer readable code is configured to be scanned by a second device. In one embodiment, the computer readable code is a QR code or a barcode. In one embodiment, the second device is a cash register system. In one embodiment, the second device is a second smartphone associated with the second user.

In one embodiment, the first input mechanism is a camera. In one embodiment, the second input mechanism is a biometric reader. In one embodiment, the previous user action is an action performed with a third device, wherein the third device is distinct from the smartphone

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
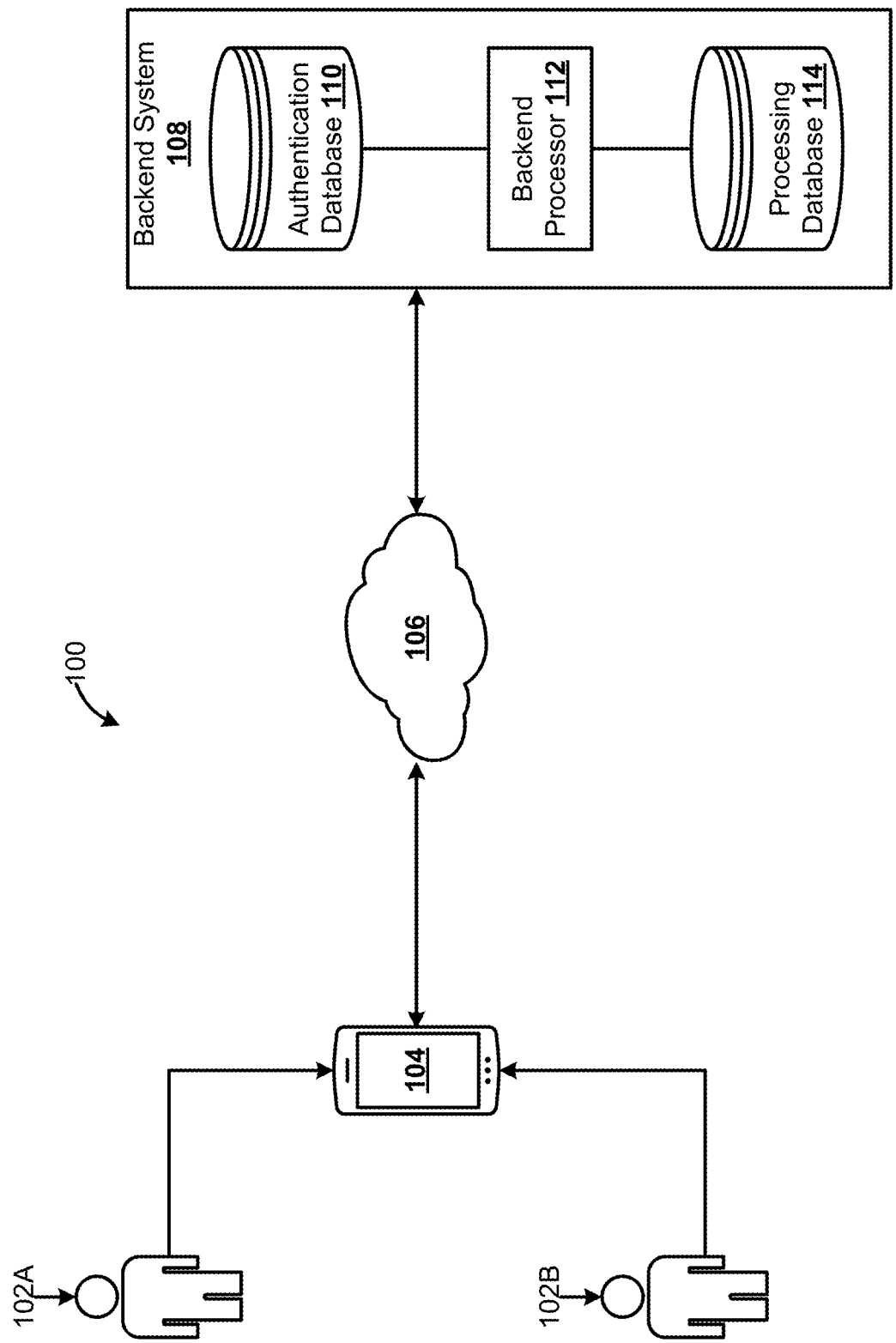
FIG. 1 illustrates a computing network in accordance with one or more embodiments described herein.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

Embodiments described herein relate generally to a multipurpose smartphone device. More specifically, embodiments described herein disclose a smartphone that is capable of being used as a point-of-sale (POS) device. POS devices may be computing devices capable of staging, initiating, and/or processing one or more transactions. POS devices may be generally located at places where transactions occur (e.g., checkout aisle, within restaurants, at retail locations, and the like). However, many POS devices are typically dedicated machines that are utilized for only POS functionalities (e.g., staging, initiating, and/or processing transactions). In addition, locations may need to be outfitted with a plurality of POS devices in order to have POS functionalities. The process of outfitting a location with POS devices is time consuming and expensive. Therefore there is a need for a solution to avoid utilizing expensive stand-alone POS devices.

The majority of people in the United States (and other countries) own and use a smartphone. Embodiments described herein utilize a smartphone to conduct one or more processes that may be typically handled by a dedicated POS device. A first user (i.e., the owner of the smartphone) may first authenticate himself to his smartphone. The authentication may be performed via password, biometric identifiers, and the like. In one embodiment, the authentication may be referred to as a phone or application unlock. The smartphone may receive, via a communication means, a link associated with a previous action of the first user. The communication means may be means such as, but not limited to, text message, electronic mail, push notification, and the like. The link may comprise a Uniform Resource Locator (URL) that, when engaged, redirects the smartphone to a webpage. The previous user action of the first user may be an action that was taken by the first user (or another) on a different device (i.e., different device from the smartphone). For example, on a different computing device, such as a desktop computer, the first user may stage a transaction. In such an example, the link would be generated based on the first user staging a transaction via the desktop computer.

In response to displaying the link, the smartphone may receive, via a graphical user interface displayed by the smartphone, a first user interaction with the link. The smartphone may receive the first user interaction via an interaction with a touchscreen of the smartphone. The interaction with the touchscreen may indicate a selection of the link. Other means of selection may be utilized such as selection via a physical keyboard associated with the smartphone. In response to an indication that the link has been selected, the smartphone may load one or more webpages and/or invoke one or more application programming interfaces (APIs). The functions associated with the one or more webpages and/or the one or more APIs comprise instructions that when executed by the smartphone, configure the smartphone to securely perform one or more processes described herein. The instructions may also comprise user instructions to display, to one or more users, to aid the smartphone in one or more data gathering processes. For example, user instructions may be displayed to a second user. The second user may be a location agent that helps conduct transactions at a particular location. For example, a location agent may be a waiter at a restaurant, a bank teller at a bank, an agent at a WESTERN UNION location, and the like. In one embodiment, the term "instructions" may refer to one or more computer executable operations and the term "user instructions" may refer to displayed instructions for performance by one or more users associated with a smartphone.

The instructions, when executed by the smartphone, may cause the smartphone to request authentication information from the second user. Similar to a cashier, the second user may perform one or more functions associated with the processes conducted by the smartphone. Because of the actions to be performed by the second user, the smartphone may request authentication information from the second user. Authentication information may include biometric information, password, or other identification. In one embodiment, authentication information may be received via various means. For example, a second user identifier may be received via a text box displayed by the smartphone. The second user identifier may then be utilized by the smartphone to authenticate the second user. Furthermore, the smartphone may use an associated camera (e.g., an integrated camera) to perform facial recognition of the second user. In similar embodiments, the smartphone may use an associated fingerprint reader (e.g., an integrated fingerprint reader) to perform fingerprint recognition of the second user. One or more of types of authentication information may be received by the smartphone. For example, a second user identifier may be received via a displayed text box and the second user's face may be scanned via a camera. Subsequently, the smartphone authenticates the second user based on received authentication information.

Once the second user has been authenticated by the smartphone, the smartphone may authorize an action by the second user. The smartphone may display to the second user a set of user instructions for facilitating an authorized action. The authorized action may be to retrieve payment from the first user, to further identify the first user, and the like. In one embodiment, the authorized action may be to take a photograph or scan, using the smartphone, an identification of the first user such that the smartphone may further authenticate the first user. In one embodiment, the authorized action may be for the second user to request some form of payment from the first user, such as a credit card. The smartphone may then receive credit card information, via an attached card reader or camera, and process, based on the received credit card information, a staged transaction associated with the previously received link.

After displaying the user instructions for facilitating the authorized action, the smartphone may receive confirmation that the authorized action has been completed. For example, the smartphone may receive an input from the second user indicating that the authorized action has been complete. In one embodiment, the smartphone may perform constant authentication of the second user, after the second user has been initially authenticated and up until confirmation of the authorization action. Constant authentication may be performed over a certain time period (e.g., every 5 seconds, every 10 seconds, and the like) using a certain authentication mechanism (e.g., facial recognition, location detection, scanning, by the smartphone, a Radio Frequency Identifier (RFID) associated with the second user, and the like). For example, the user may be required to be in a particular location while performing one or more actions. In another example, the second user may be required to have the smartphone face them while performing one or more actions so that it can be confirmed that the second user is the one in possession of the phone while specific actions are being performed. Such constant authentication allows the smartphone to accurately determine that a certain party is performing the actions that it is supposed to. For example, if the authorized action is for the second user to receive some form of payment from the first user, the smartphone, via constant authentication, may accurately determine that, in fact, the second user is the one who is receiving the payment instead of a fraudulent third party. Furthermore, the second user may be required to indicate that the authorization action has been completed, such as by touching a graphical user interface button (e.g., a confirm button). The smartphone, using constant authentication, may assure that it is in fact the second user who is pressing the graphical user interface button to confirm that the authorized action has been performed.

Once the smartphone has received an indication that the authorized action has been completed, an authorized action indicator is transmitted to a backend system for storage. The authorized action indicator may record several details of one or more processes performed by the smartphone such that it may be utilized if any disputes later arise.

By utilizing a smartphone to perform one or more processes described herein, an improvement to smartphone technology is recognized. Rather than have a location outfitted with one or more expensive single-use POS systems, a user may enter a location with his smartphone and perform one or more processes using just his smartphone. Furthermore, features on a smartphone such as fingerprint scanners, facial recognition, internet connection, and the like allow the smartphone to securely perform one or more processes described herein. Thus, the functionality of a smartphone is greatly enhanced as it may be used to replace costly POS systems. In addition, embodiments described herein are an improvement to POS technology. Many POS systems are single use in that they are only used to process transactions. However, by implementing one or more POS function on a smartphone it allows POS functionality from a consumer device. Implementing POS functionalities on a non-single use device like a smartphone decreases the hardware cost of performing POS functions via a traditional single use POS machines. Other advantages may be realized by embodiments disclosed herein.

FIG. 1 illustrates an example computing network 100 for implementing one or more embodiments described herein. Network 100 comprises users 102A-102B, smartphone 104, network 106, and backend system 108. Users 102A-102B may be users that perform one or more operations in conjunction with smartphone 104. In one embodiment, user 102A is the owner of smartphone 104 and user 102B is a location agent. In such an embodiment, user 102B is not the owner of smartphone 104. In one embodiment, user 102B may be the owner of a different smartphone other than smartphone 104. In such an embodiment, the smartphone other than smartphone 104 may be a work phone associated with a certain location or may be a personal phone of user 102B. A work phone associated with a certain location may be a company phone that is used by user 102B at least for work purposes. For example, a work phone may be issued by WESTERN UNION to employees at a first location (e.g., business location, store location, office location, and the like) for the purposes of at least completing one or more work functions. In one embodiment, the work phone may interact in one or more ways with smartphone 104. For example, the work phone may read or scan one or more computer readable mediums displayed by smartphone 104.

Smartphone 104 may be a cellular phone with one or more smart features. In one embodiment smartphone 104 is a cellular phone that performs one or more functions of a computer. Smartphone 104 may comprise of a touchscreen interface, one or more wireless connection devices (e.g., one or more system-on-chip (SoC) for cellular connections, Bluetooth connections, WiFi connections, and the like), a mobile operating system capable of running one or more applications (e.g., Google Chrome), one or more cameras (e.g., front facing camera and back facing camera), and/or one or more biometric readers (e.g., fingerprint scanner/reader). Examples of smartphone 104 may include, but are not limited to, Apple iPhone, Google Pixel, Samsung Galaxy, HTC OnePlus, Huawei P30, and the like.

Network 106 may comprise one or more wired or wireless connections to facilitate the transfer of data between smartphone 104 and backend system 108. The wired or wireless connections may be implemented by any type of network familiar to those skilled in the art that can support data communications using any of a variety of commercially-available protocols, including without limitation TCP/IP (transmission control protocol/Internet protocol), SNA (systems network architecture), IPX (Internet packet exchange), and the like. For example, smartphone 104 may be connected to backend system 108 via a local area network (LAN), a wide-area network, the Internet, a wireless network (e.g. a network operating under any of the Institute of Electrical and Electronics (IEEE) 802.11 suite of protocols, Bluetooth, and/or any other wireless protocol); and/or any combination of these.

Backend system 108 may include authentication database 110, backend processor 112, and processing database 114. Authentication database 110 may contain one or more datasets capable of being utilized by backend processor 112 to authenticate one or more users. Authentication database 110 may include, for any particular user, a user identification associated with a user (e.g., an employee identifier), a date of birth associated with the user, biometric information associated with the user (e.g., fingerprint data, facial recognition data, voice data, retinal data), a location identifier associated with the user (e.g., which business location(s) are associated with the user), an alphanumeric password, a cell phone identifier (e.g., a mobile phone identifier such as an International Mobile Equipment Identity (IMEI)), activity dates (e.g., when a user may be at a particular location for work or other purposes), address associated with the user, and the like. One or more datasets within authentication database 110 may be utilized by backend processor 112 and/or smartphone 104 to identify a user conducting one or more actions with smartphone 104.

Backend processor 112 may include one or more processing units and one or more sets of memory. The one or more processing units can be implemented as one or more integrated circuits, such as single-core or multicore processors. In one embodiment, the processing unit(s) may also be implemented as a quad-core processing unit formed by integrating two dual-core processors into a single chip. In various embodiments, the processing unit(s) can execute a variety of programs in response to program code and can maintain multiple concurrently executing programs or processes. Through suitable programming, the processing unit(s) can provide various functionalities described within this disclosure.

The memory implemented by backend processor 112 may be volatile (such as random access memory (RAM)) and/or non-volatile (such as read-only memory (ROM), flash memory, etc.). The RAM may contain data and/or program modules that are immediately accessible to and/or presently being operated and executed by the processing unit. In some implementations, the memory may include multiple different types of memory, such as static random access memory (SRAM) or dynamic random access memory (DRAM). The memory may also be a tangible computer-readable storage medium for storing the basic programming and data constructs that provide the functionality of some embodiments described by this disclosure. Software (programs, code modules, instructions) that when executed by the processing unit provide the functionality described by this disclosure.

Processing database 114 may contain workflows and instructions specific to particular transactions and/or users. A workflow may be a specific protocol (i.e., series of processing steps) to be performed by a smartphone. The workflow may be specific to one or more previous user actions. Processing database 114 may contain datasets indicating one or more previous user actions. A previous user action may include staging a transaction, an interaction with one or more webpages, and the like. For example, datasets associated with a previous user action may comprise: a transaction identifier, a user identifier (identifying a user associated with a transaction identifier), a device identifier (identifying one or more devices), a location identifier (identifying one or more locations associated with a future authorized action), a link, that when engaged may invoke one or more APIs and/or load one or more web pages, a set of instructions specific to the previous user action (e.g., a set of instructions for completing an authorized action based on datasets associated with the previous user action), and the like. Processing database 114 may also contain datasets indicating one or more completed authorized actions. For example, datasets indicating a completed authorized action may include: an authorized action identifier (e.g., identifier for receiving a form of payment), a first user identifier (e.g., identifier of owner of smartphone 104), a second user identifier (e.g., location agent identifier), a work phone identifier associated with the second user, a location identifier (e.g., a location where the authorized action occurred), transaction details (e.g., form of payment, amount of payment), one or more computer readable codes associated with an authorized action, and the like.

In one embodiment, backend processor 112 may receive, from smartphone 104, authentication information associated with one or more users. Backend processor 112 may query authentication database 110 to retrieve authentication information associated with a user and compare the retrieved authentication information to the received authentication information to make a determination whether the user is authenticated. In one embodiment, the received and retrieved authentication information may comprise of multiple pieces of data. For example, the received and retrieved authentication information may include an alphanumeric password and biometric information associated with a user. Subsequent to authenticating a user, smartphone 104 may invoke one or more API calls that retrieve information from backend system 108. The APIs may cause backend processor 112 to retrieve from processing database 114 workflows and instructions specific to a previous user action. For example, backend processor 112, as part of a workflow, may transmit a request to smartphone 104 to scan or image a government issued identifier associated with a user. In another example, backend processor 112, as part of a set of instructions, may transmit text to be displayed by smartphone 104. In such an example, the transmitted text may recite "Please confirm the identity of Peter Johnson", "Please accept a payment of $132.50", and the like. Once one or more actions (i.e., authorized actions) have been completed, smartphone 104 may transmit to backend processor 112 an authorized action indicator for storage.

Figure 2:
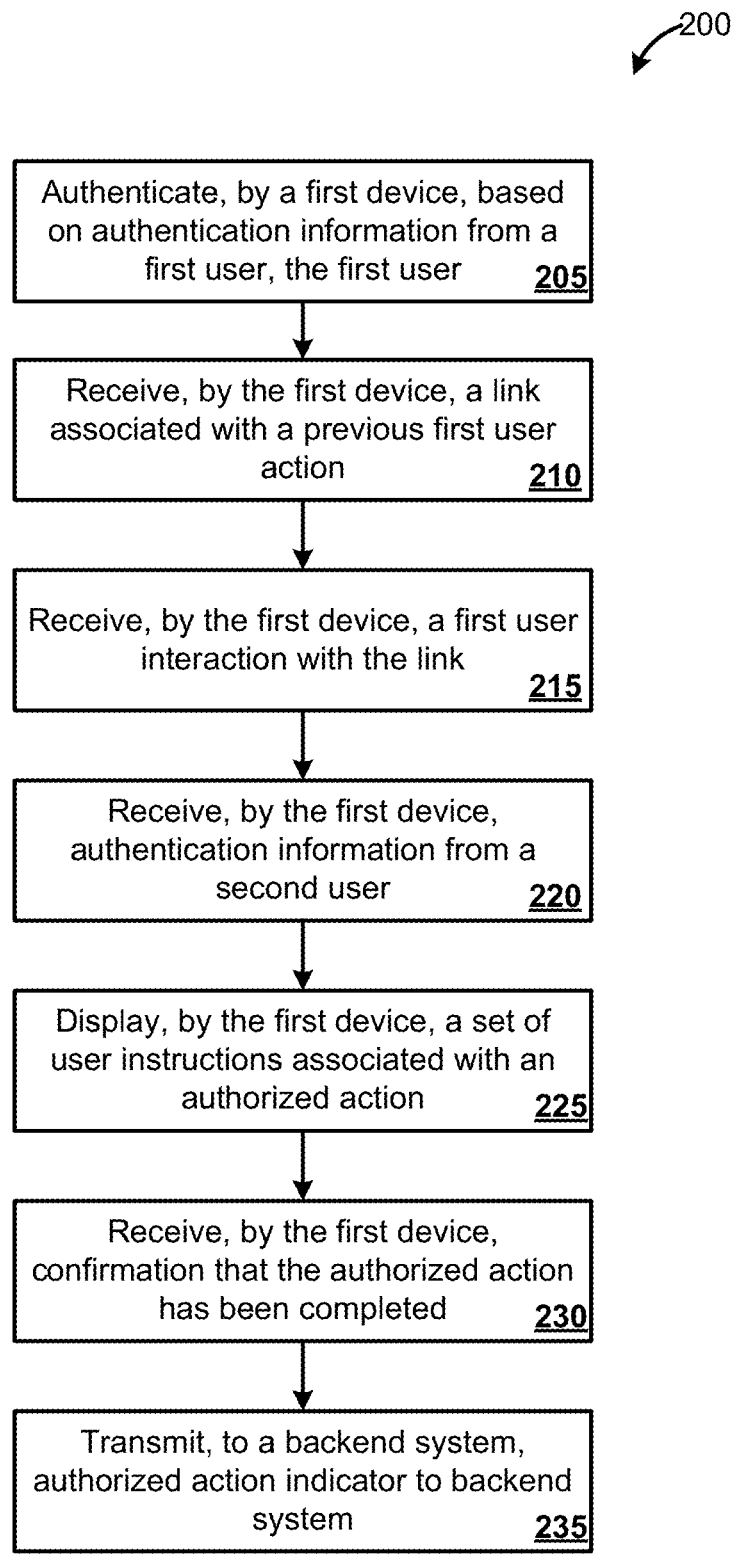
FIG. 2 depicts a first process in accordance with one or more embodiments described herein.

FIG. 2 illustrates process 200 according to one or more embodiments described herein. One or more operations of process 200 may be performed by one or more components of computer network 100. For example, one or more operations of process 200 may be performed by smartphone 104 as illustrated in FIG. 1. Process 200 may be a process for a smartphone to implement one or more processing functions.

At 205, a first device (e.g., a smartphone), authenticates, based on authentication information from a first user, the first user. The first device is a device owned and primarily operated by a first user. For example, the first device may be registered to the first user, the first device may contain personal information (e.g., login information, cookies, passwords, bank information, fitness data, and the like) associated with the first user, the first device may be customized to one or more aspects of the first user (e.g., voice assistant specific to the first user, preferences of the first user, and the like), and the like. Authentication information received from a first user may include biometric information such as a fingerprint scan or face scan, and text information such as an alphanumeric password. In one embodiment, the authentication information received by the first device may be the same authentication information used to unlock the first device. For example, after a specific time of non-use the first device may go into a sleep mode (i.e., low power mode) and may require authentication information to unlock one or more features of the first device (e.g., ability to make a phone call). In another example, an application for performing one or more operations of process 200 (and other aspects described herein) may be loaded on the first device and in order to execute one or more features of the application, the first user must be authenticated. In such an embodiment, the application may invoke one or more API calls, load one or more webpages, and initialize one or more features of the first device (e.g., facial recognition, image capture, and the like) to complete one or more functions.

At 210, the first device receives a link associated with a previous user action. The first device may receive the link via various communication means such as text message and electronic mail. The link may be generated by a backend system in response to a previous user action. The previous user action may be conducted via a device separate from the first device (e.g., another smartphone, a desktop computer, a POS system, and the like). The previous user action may be the staging of a transaction. For example, the first user may, using a separate device, indicate a desire to make a payment associated with one or more items. In response, the separate device, may send transaction information including a communication means identifier and link to the backend system. The communication means identifier may indicate a particular means to deliver the link to the first device (e.g., electronic mail). In one embodiment, the first device and the device associated with the previous user action may be the same device. In one embodiment, the first device may display, via a graphical user interface, the link, such that the link may be engaged via a touchscreen interface of the first device.

At 215, the first device receives a first user interaction with the link. The first device may receive, via a touchscreen interface, an indication of an engagement of the link. In response, the first device retrieves, from the backend system, one or more workflows and sets of instructions specific to the link. The one or more workflows may provide instructions to the first device to facilitate one or more actions. The sets of instructions may further include text to display to one or more users (i.e., user instructions). In one embodiment, the received workflow may comprise one or more API calls that the first device may invoke. For example, upon receiving the first user interaction, the received workflow may, when executed by the first device, initiate a Global Positioning System (GPS) or WiFi mechanism of the first device to generate location data associated with the first device. The first device may transmit, to the backend system, the location data and the backend system may compare the location data to location data associated with the previous user action to determine if the first device is a particular location. The location data associated with the previous user action may indicate one or more locations in which one or more actions (i.e., authorized actions) may take place (e.g., a business location, a retailer location, and the like). The workflow associated with the previous user action may only allow one or more actions to take place when the first device is in a particular location.

At 220, the first device, according to a previously received workflow, receives authentication information from a second user. The second user may be a location agent that is at a particular location. This particular location may be associated with the location data received at 215. The second user may be needed to help facilitate one or more operations associated with the first device. As a result, it is important that the second user is authorized to perform one or more actions.

Figure 4:
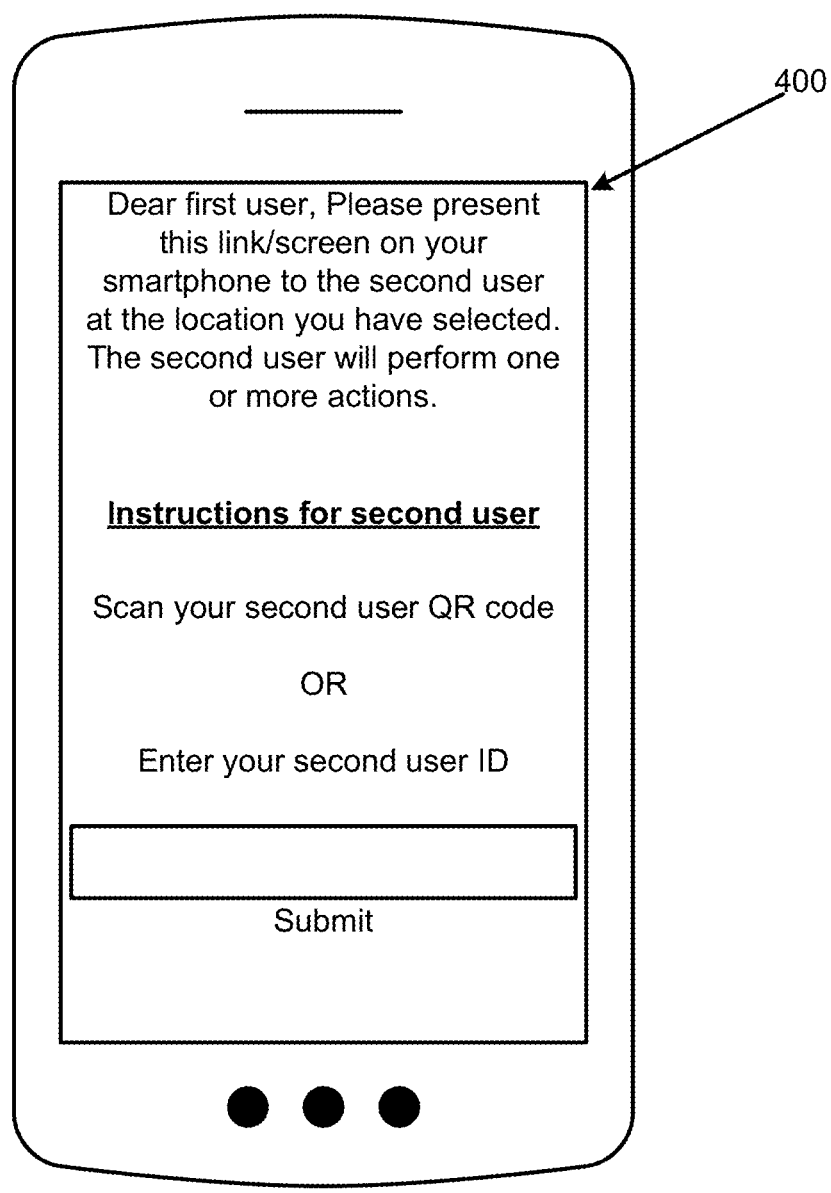
FIG. 4 illustrates a first graphical user interface in accordance with one or more embodiments described herein.

The first device may display a screen as shown in FIG. 4. Now with brief reference to graphical user interface (GUI) 400 of FIG. 4. An execution of the previously received workflow may result in the first device generating GUI 400. One or more user instructions are present on GUI 400. For example, the user instructions may request the first user to present the first device to a second user so that the second user may aid in the performance of one or more actions (e.g., scan a QR code from a work phone associated with the second user, enter a second user identification, or scan by a work phone associated with the second user a QR code displayed by the first device). In response, the first device may receive authentication parameters from the second user via a first input means (i.e., text into a graphical user interface component provided by the first device) such as a second user ID, a second user password, and the like. The first device may also receive authentication parameters from the second user via a second input means (i.e., biometric reader or recorder of first device) such as fingerprint data, facial data, voice data, and/or retinal data from the second user. The first device may also receive authentication parameters from the second user via a third input means (i.e., integrated camera of first device) such as reading a computer readable code (e.g., barcode or QR code) displayed via a second device (e.g., work phone associated with the second user).

Now with reference back to FIG. 2, once the first device receives the authentication information, the first device may locally authenticate the second user using data internal to the first device or may send the captured authentication information to the backend system for further processing. For example, the backend system may receive authentication information and determine based on previously submitted authentication information that the second user is who they claim to be.

In one embodiment, according to the first device's execution of the previously received workflow, the displayed instructions (i.e. displayed user instructions) may be modified. For example, an accelerometer, or camera integrated on the first device may detect that the first device has been passed from the first user to a second user. For example, a microphone may record a first user saying a phrase such as "pass" which indicates to the first device to modify the displayed instruction. In another example, a camera may detect a face of a user besides the first user which indicates to the first device to modify the displayed instructions. In another example, an accelerometer may detect a displacement of a phone from a first position/location to a second position/location after a first set of instructions are displayed (e.g., instructions displayed by GUI 400 of FIG. 4) which indicates to the first device it has been passed from the first user to a second user and in response the first device modifies the set of instructions displayed. The modified set of instructions displayed may change a first set of user instructions to a second set of user instructions. In one embodiment the first set of user instructions may be for the first user and the second set of user instructions may be for a second user. In one embodiment, the first set of user instructions may be for performing a first action and the second set of user instructions may be for a second action.

Figure 5:
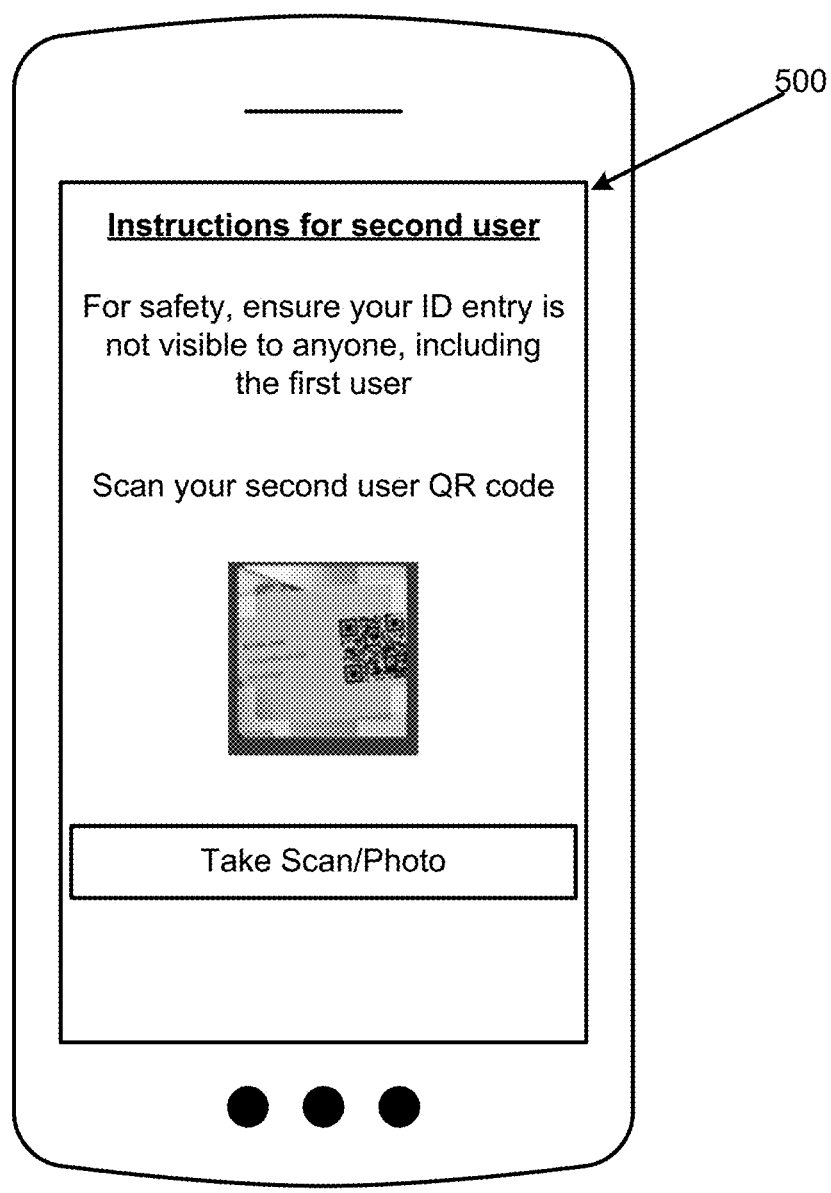
FIG. 5 illustrates a second graphical user interface in accordance with one or more embodiments described herein.
Figure 6:
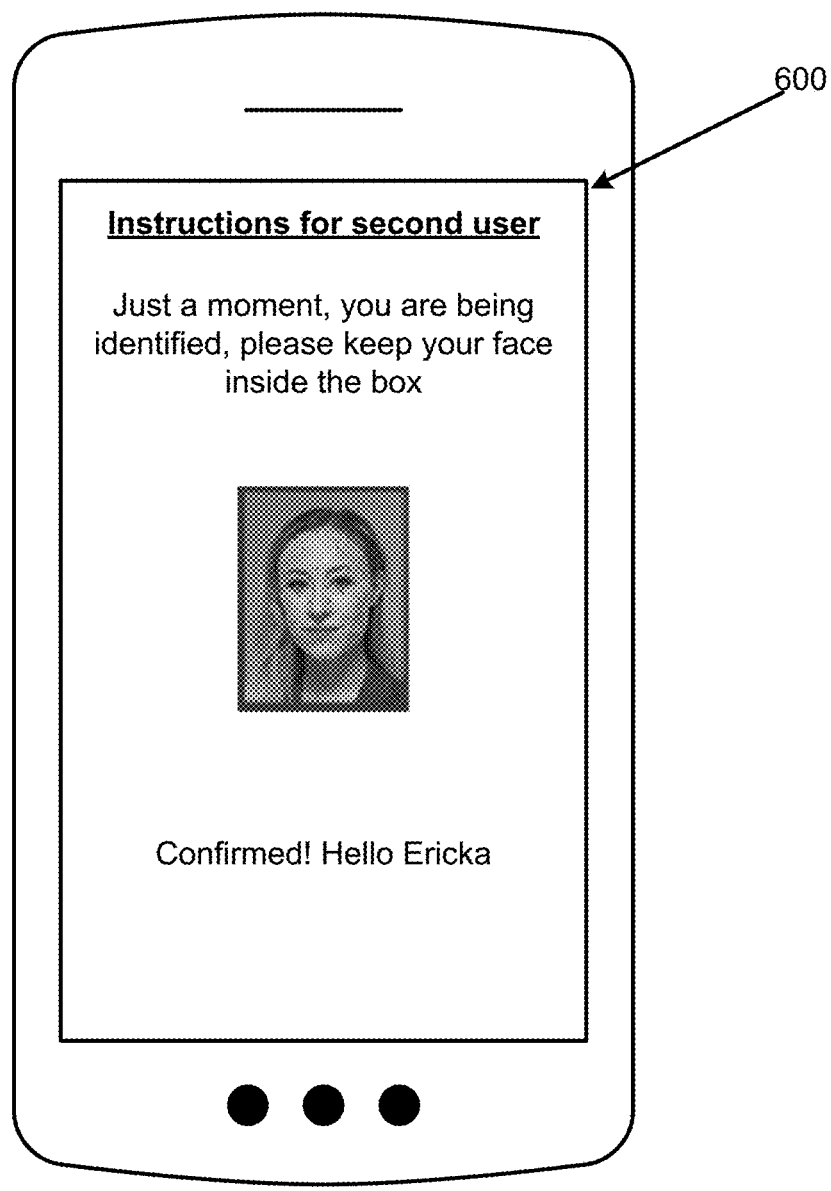
FIG. 6 illustrates a third graphical user interface in accordance with one or more embodiments described herein.

Now, with brief reference to FIGS. 5-6, the displayed instructions may be modified, based on the executed workflow, to present a new or different set of instructions (i.e., a new or different set of user instructions). GUI 500 of FIG. 5 illustrates an example set of user instructions displayed by the first device. As depicted by GUI 500, the displayed user instructions may instruct the second user to scan, via the first device, a second user QR code to authenticate the second user. The QR code may contain information such as a second user identifier that may be used to authenticate the second user. GUI 600 of FIG. 6 illustrates an example set of user instructions displayed by the first device. As depicted by GUI 600, the displayed user instructions may instruct the second user to allow the first device to perform facial recognition on the second user. Data captured by the camera of the first device may be used to authenticate the second user. It should be noted that user instructions associated with GUI 500 and GUI 600 may be displayed, via the first device, when an executing workflow indicates to the first device to modify the instructions displayed. For example, user instructions as shown in GUI 400 may be initially displayed, then the first device may receive an input that indicates, according to an executing workflow, that the displayed instructions should be modified. As a result of receiving such an indication, GUI 500 or GUI 600 may be displayed. In one embodiment, GUI 500 and GUI 600 may be sequentially displayed. In such an embodiment, multiple pieces of data may be utilized to authenticate the second user (e.g., QR code and biometrics).

Now with returned reference to FIG. 2, at 225, the first device displays a set of user instructions associated with an authorized action. Once the second user is authenticated, the first device, according to an executing workflow, may authorize an action by a second user. In one embodiment, authentication information captured by the first device is sent to the backend system to compare against previously stored authentication information to authenticate the second user. In such an embodiment, the backend system, in response to a positive authentication may transmit indications of one or more authorized actions to be performed by the first device while in possession of the second user. The indication of authorized actions may be stored in a processing database within the backend system. The processing database may store information of authorized actions associated with specific previous user actions. This way, the workflow executed by the first device and each set of instructions displayed by the first device may be specific to a specific previous user action. For example, authorized actions may be different for each previous user action. In such an example, according to one previous user action, additional identification may be required from the first user. In another example, a particular form of payment may be acceptable for a particular previous user action that may not be acceptable for another previous user action. In another example, only specific second users are permitted to perform authorized actions associated with particular previous user actions.

Figure 7:
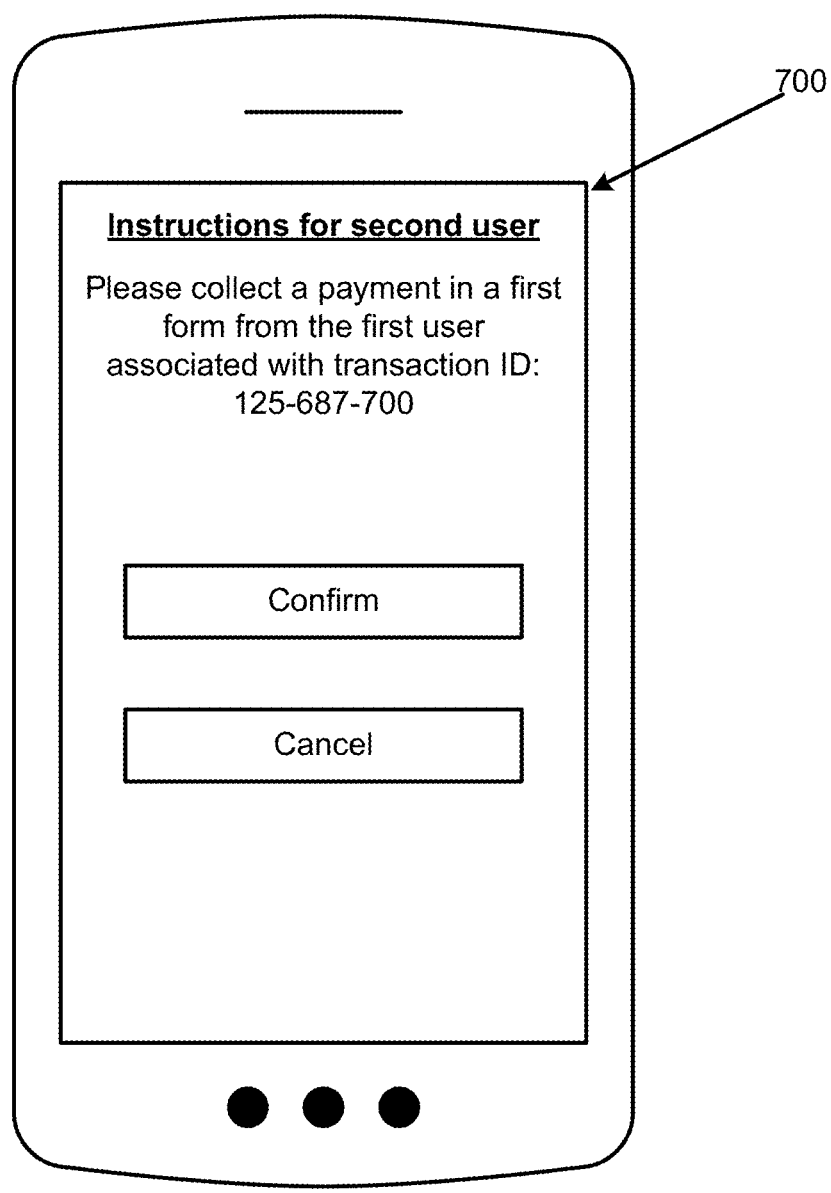
FIG. 7 illustrates a fourth graphical user interface in accordance with one or more embodiments described herein.

Now with brief reference to FIG. 7, GUI 700 illustrates a set of user instructions to perform an authorized action. The authorized action may be collecting a payment in a certain form (e.g., cash or credit card) from the first user associated with transaction ID: 125-687-700. Transaction ID: 125-687-700 may be a transaction identifier associated with a previous user action. Once the second user takes the payment they may select confirm. However, if the second user does not take the payment they may select cancel.

In situations where the first device is utilized to complete a transaction, the first device may be incapable of accepting payment associated with a transaction (e.g., a smartphone cannot except cash). Thus, by authenticating the second user, the transaction may still be securely facilitated with the help of the second user. In one embodiment, after GUI 700 is displayed, according to a specific time period (e.g., 5 seconds, 10 seconds, and the like), the first device may perform facial recognition, take a picture of the second user, take a picture indicating the absence of the second user, and the like. This way, the first device may detect if the second user is the one who is accepting the payment. For example, if a facial recognition performed cannot confirm the second user is the user receiving a payment, then the first device may send an alert to the backend system. In another example, if images captured do not show a payment in a particular amount, the first device may send an alert to the backend system. These alerts may be stored by the backend server and may be utilized for any future dispute resolutions. As can be seen, the functionalities of the first device provide a more secure transaction (at least due to the monitoring capabilities) environment than traditional POS systems which may simply require any employee to "log-on" to the POS to help to facilitate a transaction. Such traditional POS systems do not perform periodic authentication checks during the facilitation of a transaction, but instead just require an initial log in. Furthermore, traditional POS systems do not have authorized actions specific to particular situations. Instead, traditional POS systems allow an operator to perform the same action regardless of the details associated with the transaction. Other advantages over traditional POS systems may be realized.

In addition, at least the concept of authorized actions may be applied to other fields besides financial transactions. For example, a smartphone may be utilized to confirm an identity of a person based on a previously stored workflow. In such an example, a particular user may want to enter a particular location (e.g., a movie, a concert and the like), but the user has forgotten his identification. In this case, a previous user action may be the user transmitting facial recognition data, voice recognition data, a copy of a physical identification (e.g., government issued identification), and the like to an authentication database of a backend system. The backend system may determine a specific set of authentication information to be properly authenticated. For example, the backend system may determine the user may enter a particular movie according to his voice, the user may enter a particular concert according to facial recognition, the user may enter a nightclub according to his voice and physical identification (such a scenario would prevent the use of fake identifiers), and the like. When a user attempts to enter the particular location, a smartphone may be utilized to capture authentication data associated with the user and in response to the captured authentication data transmit user instructions to indicate an authorized action. For example, the authorized action may be to allow the user to enter a location or to deny the user access to a particular location. By utilizing authentication information and authorized actions, a smartphone may be utilized to enhance authentication technology and potentially thwart the use of fake identifiers.

With returned reference to FIG. 2, at 230, the first device receives confirmation that the authorized action has been completed. Such a confirmation may come by the second user interacting with the first device. For example, with brief reference to FIG. 7, the first device may receive confirmation from an interaction with the button labeled "confirm" as illustrated by GUI 700. In another embodiment, the first device may receive a confirmation via another device. For example, a peripheral device may be attached to the first device to accept a particular form of payment (e.g., credit card reader). In such an example, after a payment is received (e.g., an authorized action) the peripheral device may indicate to the first device that the payment has been accepted. Such an indication may constitute a conformation that an authorized action has been completed. In one embodiment, similar to 225, during operations associated with 230, constant authentication may be performed to ensure that it is the second user who is providing confirmation of the authorized action.

At 235, the first device may transmit an authorized action indicator to the backend system. The authorized action indicator may record several details of one or more processes performed by the first device such that it may be utilized if any disputes later arise. For example, the authorized action indicator may include one or more images taken during one or more operations associated with 215-235. In such an example, the first user may dispute that a transaction happened and in response the backend system may be queried to provide evidence associated with the transaction. The authorized action indicator may also indicate a second user identifier, a location identifier, a time duration associated with one or more processes, and the like.

Figure 3:
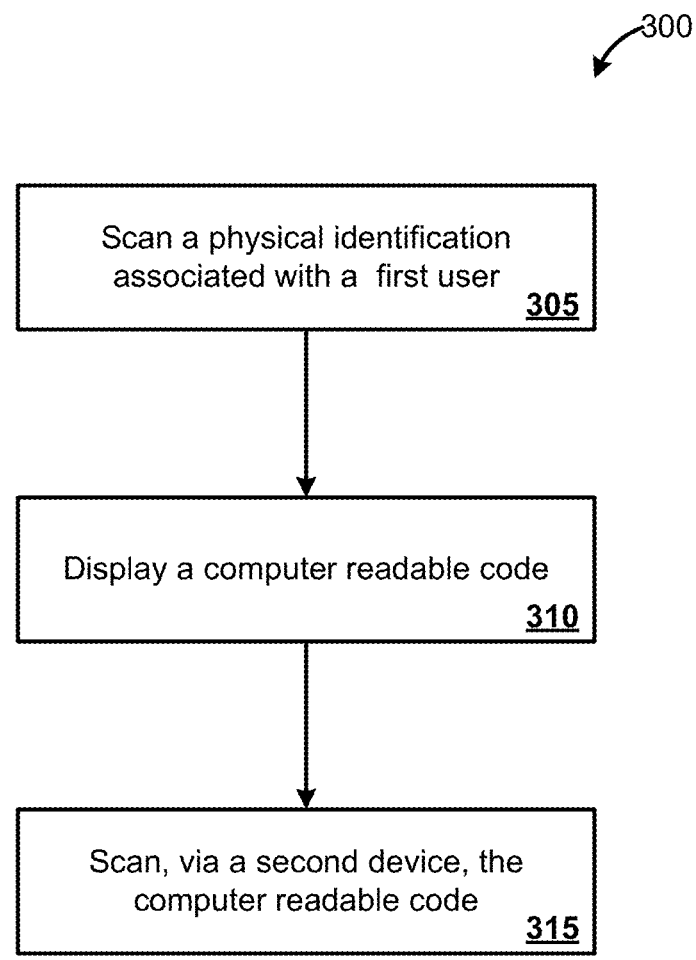
FIG. 3 depicts a second process in accordance with one or more embodiments described herein.

FIG. 3 illustrates process 300 according to one or more embodiments described herein. One or more operations of process 300 may be performed by one or more components of computer network 100. For example, one or more operations of process 300 may be performed by smartphone 104 as illustrated in FIG. 1. Process 300 may be a process associated with one or more authorized actions associated with a smartphone to implement one or more processing functions.

Figure 8:
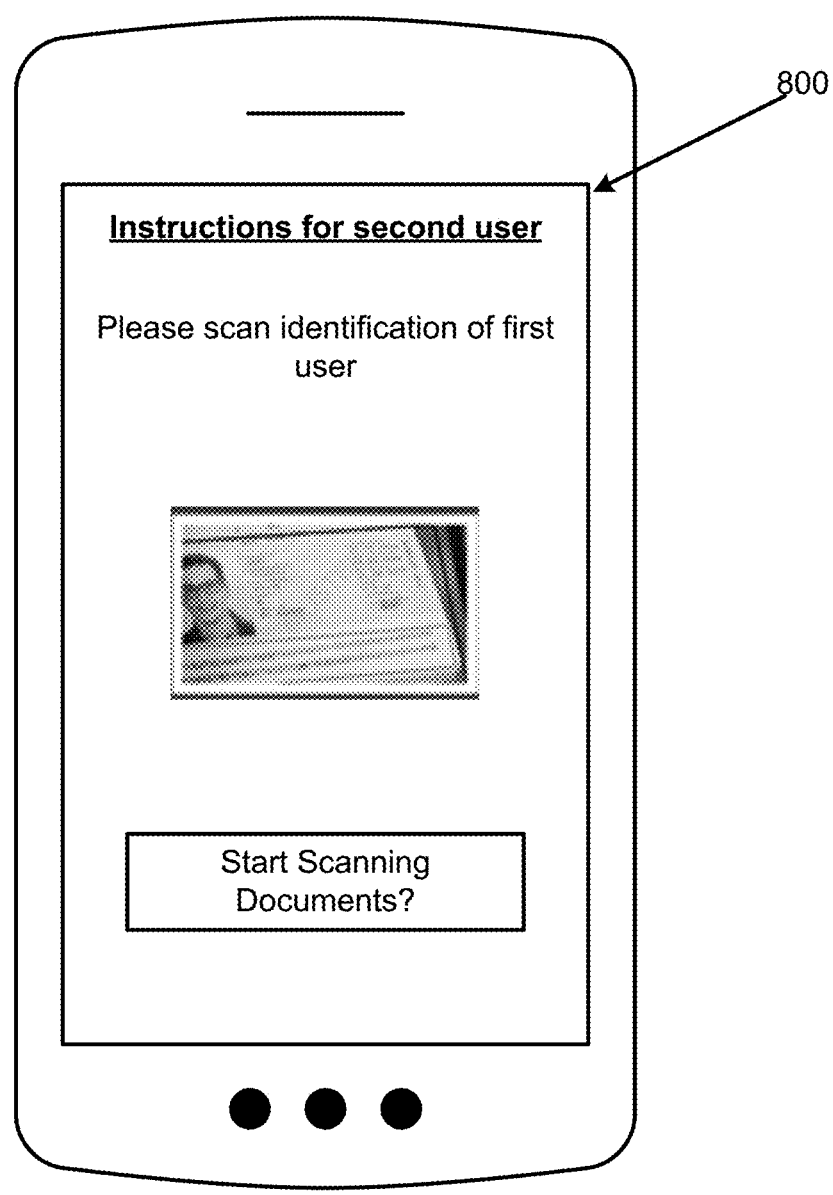
FIG. 8 illustrates a fifth graphical user interface in accordance with one or more embodiments described herein.

At 305, a first device (i.e., a smartphone) scans a physical identification associated with a first user. Prior to 305, one or more processes associated with process 200 may be performed. For example, 305 of process 300 may occur after 225 of process 200. In such an example, 305 (and other parts of process 300) may be considered variations of authorized actions. A second user (e.g., a location agent), utilizing the first device, may be instructed to scan a physical identification associated with the first user. Now with brief reference to FIG. 8, GUI 800 illustrates a display of the first device in accordance with 305. GUI 800 displays a set of instructions for the second user to scan, via the first device, a physical identification. As shown in GUI 800, the first device may indicate an image currently visible by an internal camera and the first device may provide a button for the second user to select to cause the first device to scan the visible image. In one embodiment, the first user may have been previously authenticated to the first device for an application or a device wakeup. However, by scanning the first user's physical identification, further authentication may be performed by the first device. This additional authentication is particularly useful for smartphones, because log-in credentials of smartphones or apps on smartphones may be known by a variety of people (e.g., friends, spouse, children, and the like). Such a process may be important when the first user is attempting to make a transaction that has an age restriction (e.g., purchasing pharmaceuticals). Additional authentication based on a scanned physical identification may entail the first device transmitting to a backend system, the data associated with scanned physical identification. The backend system may then compare the data associated with the physical identifier with a previously stored data and send an authentication determination back to the first device. In situations where the data associated scanned physical identification does not match a corresponding stored data, one or more additional authorized actions may be prohibited (e.g., the second user accepting a payment). In addition, in situations where the scanned physical identification does not meet particular criteria associated with a previous user action then one or more additional authorized actions may be prohibited. For example, a previous user action may be staging a transaction for a pharmaceutical purchase. In such an example, the scanned physical identification may be parsed to determine that the age of the first user is above a certain threshold.

Figure 9:
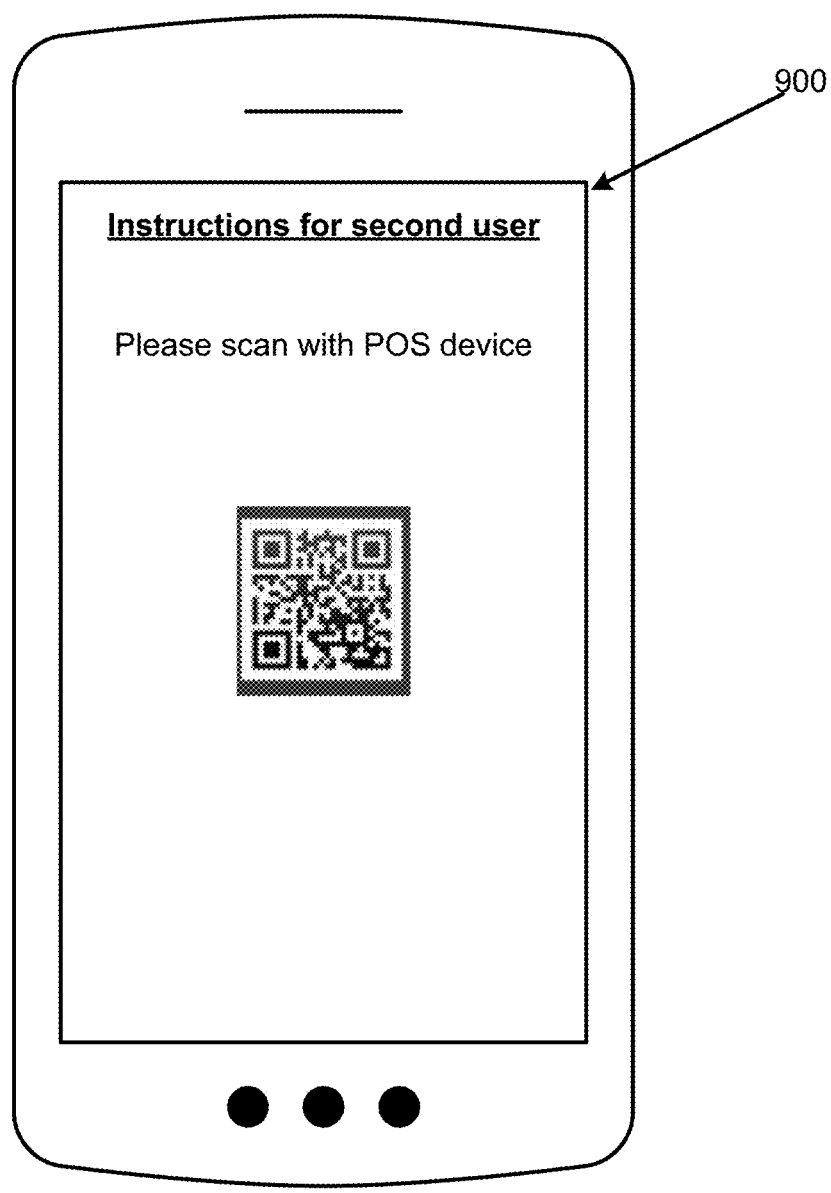
FIG. 9 illustrates a sixth graphical user interface in accordance with one or more embodiments described herein.

At 310, the first device displays a computer readable code. The computer readable code may take the form of a QR code or a standard barcode. The computer readable code may be read by a second device (e.g., a work phone associated with the second user or an external POS device). Now with brief reference to FIGS. 9-10. FIG. 9 illustrates GUI 900 displayed by the first device. The QR code displayed by the first device may be configured to be read by a POS device (e.g., second device). This POS device may have a camera that is able to scan and receive contents stored within the displayed QR code. In one embodiment, once scanned, the POS device may be utilized to facilitate the performance of one or more authorized actions by the second user. For example, the POS device may be utilized to receive payment (e.g., a credit card payment). In such an example, the POS device may send a confirmation that an authorized action has been completed to the first device via one or more wireless communication means such as radio frequency (RF), Bluetooth, Near Field Communication (NFC), the Internet, and the like. The POS device may also send the authorized action indication to the backend system.

Figure 10:
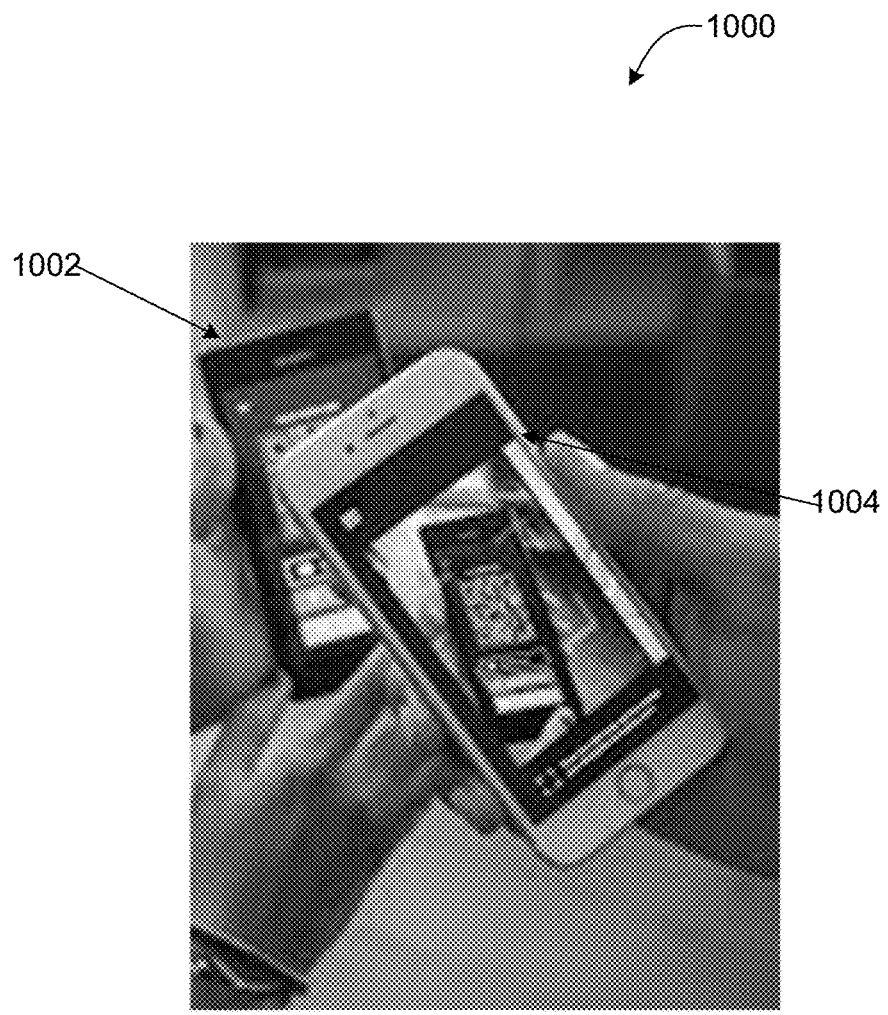
FIG. 10 illustrates an interaction between multiple devices in accordance with one more embodiments described herein.

FIG. 10 illustrates interaction 1000 performed by the first device 1002 and a work phone 1004 (e.g. second device) associated with the second user. The first device 1002 may display a QR code similar to the QR code illustrated in GUI 900 of FIG. 9. However, this QR code may be scanned by a work phone 1004 instead of a POS device. Work phone 1004 may be a smartphone. Work phone 1004 may have a camera that is able to scan and receive contents stored within the displayed QR code. In one embodiment, once scanned, work phone 1004 may be utilized to facilitate the performance of one or more authorized actions by the second user. For example, one or more or all of the instructions for the second user may be displayed via work phone 1004. Such an example is in contrast to, for example, operations associated with 220-235 of process 200. In process 200, a single device was utilized by the first and second users. However, as illustrated by interaction 1000, one or more or all of the user instructions for the second user may be displayed via work phone 1004. For example, instead of first device 1002 displaying instructions and being utilized to perform facial recognition on the second user, work phone 1004 may be utilized to display instruction for and perform facial recognition on the second user. Furthermore, instead of first device 1002 displaying instructions and being utilized to perform additional authentication of a first user via a physical identification, work phone 1004 may be utilized to display instructions for and scan the physical identification. Furthermore, any operations associated with GUI 500, GUI 600, GUI 700, and/or GUI 800 may be performed by the work phone 1004 instead of first device 1002. An embodiment where work phone 1004 is utilized may be helpful in instances where a first device may not be secure (e.g., has a virus, does not have updated software, does not have an updated application for performing one or more operations described herein, and the like). Work phone 1004 may be a company phone such as phones distributed to employees of WESTERN UNION. Such company phones may be universally and mandatorily updated to keep up with the current software and virus protection. However, first device 1002 may be a personal smartphone that does not have up-to-date virus protection or software, making it potentially vulnerable to malware and malicious third-parties. Thus, having work phone 1004 perform one or more operations may enhance the security smartphone-based operations. Furthermore, having work phone 1004 perform one or more operations may enhance the technology of smartphones as it allows two smartphones to be utilized to perform secure functions previously unavailable to smartphones.

In one embodiment, operations associated with 305, 310, 315 may only be performed for particular previous user actions. Each previous user action may have one or more workflows and instructions workflow specific for the previous user action. For example, a first previous user interaction may be associated with a first workflow that utilizes operations associated with 305, such a workflow may be utilized when a previous user action requires additional authentication of the first user (e.g., purchasing of pharmaceuticals, alcohol, and the like). In another example, the computer readable code may only be displayed by the first device when a second previous user interaction is associated with a second workflow, that when executed by the first device, determines that the first device's software (e.g., virus software, operating system software, application software for performing one or more operations discloses herein) is out of date. In such an example, the second previous user interaction may be associated with a high value transaction (e.g., over 20,000 USD). As a result, extra precautions may need to applied to make sure the transaction is not subject to any viruses or malicious third-parties.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in any order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising:
receiving, by a smartphone of a first user and from a remote system, a link associated with a previous user action of the first user corresponding to a transaction associated with the first user;
receiving, via a graphical user interface associated with the smartphone, a first user interaction with the link;
consequent to receiving the first user interaction with the link, detecting, by the smartphone, a passing of the smartphone from the first user to a second user, where:
the second user is physically different from the first user;
the passing of the smartphone corresponds to physically displacing the smartphone from the first user to the second user; and
the detecting the passing is based at least in part on the smartphone using a camera to detect the second user via image recognition, an accelerometer to detect movement of the smartphone from the first user to the second user, a microphone to detect the passing via a voice command, and/or another detection component to detect one or more indicators of the passing of the smartphone;
modifying, by the smartphone, one or more instructions in response to the detecting the passing, where the one or more instructions are modified for the second user;
receiving, by a first input mechanism associated with the smartphone, first identification information for authentication of the second user;
receiving, by a second input mechanism associated with the smartphone, second identification information for authentication of the second user;
using the first identification information for authentication and the second identification information for authentication to authenticate the second user, wherein the authenticating comprises iteratively authenticating the second user with the first input mechanism or the second input mechanism at least in part while the second user performs one or more actions according to the one or more modified instructions for the second user; and
in response to authenticating the second user:
authorizing the second user to conduct the transaction associated with the first user; and
displaying, via the smartphone, a set of instructions specific to the first user, wherein the set of instructions contain information for conducting the transaction associated with the first user.

2. The method of claim 1, further comprising:
in response to authenticating the second user:
scanning, by the smartphone, a first identification instrument associated with the first user.

3. The method of claim 2, wherein the first identification instrument is a government-issued identification.

4. The method of claim 1, further comprising:
in response to authenticating the second user:
displaying, via the smartphone, a computer-readable code, wherein the computer-readable code is configured to be scanned by a second device.

5. The method of claim 4, wherein the computer-readable code is a QR code or a barcode.

6. The method of claim 4, wherein the second device is a cash register system.

7. The method of claim 4, wherein the second device is a second smartphone associated with the second user.

8. The method of claim 1, wherein the first input mechanism is the camera.

9. The method of claim 1, wherein the second input mechanism is a biometric reader.

10. The method of claim 1, wherein the previous user action is an action performed with a third device, wherein the third device is distinct from the smartphone.

11. A non-transitory, computer-readable storage medium having stored thereon instructions for causing at least one processing device to perform one or more operations, the operations comprising:
receiving a link from a remote system and associated with a previous user action of a first user corresponding to a transaction associated with the first user;
receiving, via a graphical user interface, a first user interaction with the link;
consequent to receiving the first user interaction with the link, detecting, by a smartphone, a passing of the smartphone from the first user to a second user, where:
the second user is physically different from the first user;
the passing of the smartphone corresponds to physically displacing the smartphone from the first user to the second user; and
the detecting the passing is based at least in part on the smartphone using a camera to detect the second user via image recognition, an accelerometer to detect movement of the smartphone from the first user to the second user, a microphone to detect the passing via a voice command, and/or another detection component to detect one or more indicators of the passing of the smartphone;
modifying, by the smartphone, one or more instructions in response to the detecting the passing, where the one or more instructions are modified for the second user;
receiving, by a first input mechanism, first identification information for authentication of the second user;

receiving, by a second input mechanism, second identification information for authentication of the second user;

using the first identification information for authentication and the second identification information for authentication to authenticate the second user, wherein the authenticating comprises iteratively authenticating the second user with the first input mechanism or the second input mechanism at least in part while the second user performs one or more actions according to the one or more modified instructions for the second user; and in response to authenticating the second user:

authorizing the second user to conduct the transaction associated with the first user; and displaying a set of instructions specific to the first user, wherein the set of instructions contain information for conducting the transaction associated with the first user.

12. The non-transitory, computer-readable storage medium of claim 11, the operations further comprising: in response to authenticating the second user:

scanning a first identification instrument associated with the first user.

13. The non-transitory, computer-readable storage medium of claim 12, wherein the first identification instrument is a government-issued identification.

14. The non-transitory, computer-readable storage medium of claim 11, the operations further comprising:

in response to authenticating the second user:

displaying a computer-readable code, wherein the computer-readable code is configured to be scanned by a second device.

15. The non-transitory, computer-readable storage medium of claim 14, wherein the computer-readable code is a QR code or a barcode.

16. The non-transitory, computer-readable storage medium of claim 14, wherein the second device is a cash register system.

17. The non-transitory, computer-readable storage medium of claim 14, wherein the second device is a second smartphone associated with the second user.

18. The non-transitory, computer-readable storage medium of claim 11, wherein the first input mechanism is the camera.

19. A system comprising:

one or more processors; and a memory coupled with the one or more processors, the memory configured to store instructions that, when executed by the one or more processors, cause the one or more processors to perform operations comprising:

receiving, by a smartphone of a first user and from a remote system, a link associated with a previous user action of the first user corresponding to a transaction associated with the first user;

receiving, via a graphical user interface, a first user interaction with the link;

consequent to receiving the first user interaction with the link, detecting, by the smartphone, a passing of the smartphone from the first user to a second user, where:

the second user is physically different from the first user;

the passing of the smartphone corresponds to physically displacing the smartphone from the first user to the second user; and the detecting the passing is based at least in part on the smartphone using a camera to detect the second user via image recognition, an accelerometer to detect movement of the smartphone from the first user to the second user, a microphone to detect the passing via a voice command, and/or another detection component to detect one or more indicators of the passing of the smartphone;

modifying, by the smartphone, one or more instructions in response to the detecting the passing, where the one or more instructions are modified for the second user;

receiving, by a first input mechanism, first identification information for authentication of the second user, wherein the second user is different from the first user;

receiving, by a second input mechanism, second identification information for authentication of the second user;

using the first identification information for authentication and the second identification information for authentication to authenticate the second user, wherein the authenticating comprises iteratively authenticating the second user with the first input mechanism or the second input mechanism at least in part while the second user performs one or more actions according to the one or more modified instructions for the second user; and in response to authenticating the second user:

authorizing the second user to conduct the transaction associated with the first user; and displaying a set of instructions specific to the first user, wherein the set of instructions contain information for conducting the transaction associated with the first user.

20. The system of claim 19, wherein the operations further comprise:

scanning a first identification instrument associated with the first user.

* * * * *